United States Patent [19]

Mukai

[11] Patent Number: 4,864,345
[45] Date of Patent: Sep. 5, 1989

[54] DISTANCE MEASURING AND LIGHT MEASURING OPTICAL SYSTEM

[75] Inventor: Hiromu Mukai, Osaka, Japan

[73] Assignee: Minolta Camera Kabushiki Kaisha, Osaka, Japan

[21] Appl. No.: 241,443

[22] Filed: Sep. 7, 1988

[30] Foreign Application Priority Data

Sep. 11, 1987 [JP] Japan .................. 62-227948

[51] Int. Cl.$^4$ ............................... G03B 3/00
[52] U.S. Cl. ............................ 354/403; 354/402
[58] Field of Search ............... 354/400, 402, 403, 406

[56] References Cited

U.S. PATENT DOCUMENTS

| 4,461,557 | 7/1984 | Kimura | 354/402 |
| 4,488,799 | 12/1984 | Suzuki et al. | 354/406 |
| 4,557,580 | 12/1985 | Suzuki | 354/406 |
| 4,561,748 | 12/1985 | Omaki et al. | 354/403 |
| 4,697,905 | 10/1987 | Fujibayashi et al. | 354/406 |
| 4,716,284 | 12/1987 | Tanaka | 354/403 |

FOREIGN PATENT DOCUMENTS 56-11051  3/1981  Japan .

Primary Examiner—Russell E. Adams
Attorney, Agent, or Firm—Price, Gess & Ubell

[57] ABSTRACT

A distance measuring and light measuring optical system which permits an automatic exposure camera to have a minimized number of windows for various optical systems and to be minimized in size and production cost. The optical system comprises an exposure setting light measuring optical system, and a mirror interposed obliquely in an optical axis of the exposure setting light measuring optical system. The mirror has a dielectric multi-layer film coated thereon for selectively reflecting light of a predetermined wavelength for measurement of a distance but transmitting light of any other wavelength therethrough. Either a light receiving means of an automatic distance measuring means is disposed on an optical axis of light of the predetermined wavelength reflected by the mirror or else a light emitting means of the automatic distance measuring means is disposed such that light emitted therefrom may be reflected by the mirror in a direction coincident to the direction of the optical axis of the exposure setting light measuring optical system.

11 Claims, 4 Drawing Sheets

L = MgF$_2$
H = Al$_2$O$_3$

F I G. 3
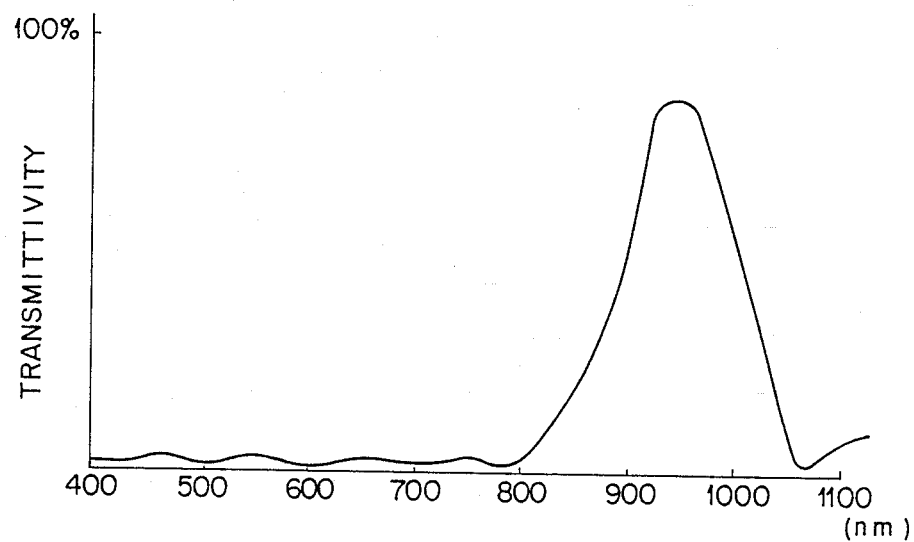
F I G. 4
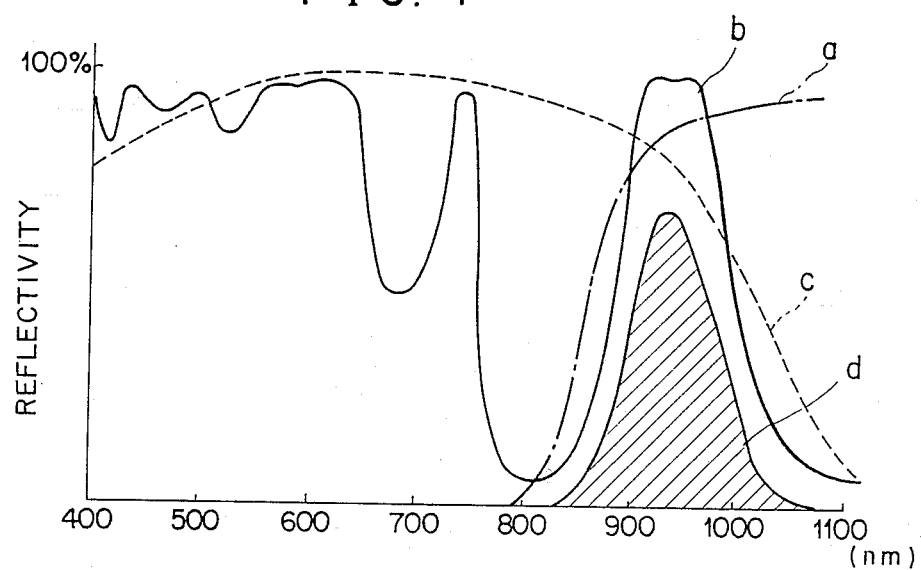

DISTANCE MEASURING AND LIGHT MEASURING OPTICAL SYSTEM

BACKGROUND OF THE INVENTION

1. Field of the Invention

This invention relates to a distance measuring and light measuring optical system for an automatic exposure camera.

2. Description of the Prior Art

Miniaturization and reduction in price are still demanded for recent cameras. However, since cameras have been progressively automated and require many various measuring functions, conventionally they have at least five windows formed thereon. FIG. 5 shows an exemplary one of such conventional cameras. Referring to FIG. 5, the camera shown has, in addition to a photographing lens 2, five windows including a flash device 6, a window of a viewfinder optical system 10, a window for a distance measuring light receiving optical system 8, a window for a distance measuring light throwing optical system 9 and an exposure setting light measuring window 11. A conventional distance measuring and light measuring viewfinder optical system employed in such a camera as shown in FIG. 5 is illustrated in an enlarged scale in FIG. 6. Referring to FIG. 6, the light throwing optical system 9 includes an infrared LED (light emitting diode) 9-2 for emitting an infrared ray therefrom, and a lens 9-1 for collimating an infrared ray from the infrared LED 9-2 to be projected upon an object for photographing. The infrared light reflected from the object is condensed by a light receiving lens 8-2 of the light receiving optical system 8 to form an image of the object on an array of light receiving cells 8-4. The position of the image on the light receiving cells 8-4 varies depending upon the position of the object with respect to the camera, and accordingly, the distance from the object can be detected in accordance with the principle of a trigonometrical survey by measuring the position of the image on the light receiving cells 8-4. In this instance, however, if light other than the projected light reflected from the object is received, then it will make an error signal. Accordingly, light of a single predetermined wavelength is employed as the light to be projected while an infrared ray transmitting filter 8-1 and a band pass filter 8-3 are disposed in front of the light receiving cells 8-4 in order that light only of the predetermined wavelength may be received on the light receiving side. The viewfinder optical system 10 includes a concave lens 10-1 and a convex lens 10-2. The light measuring optical system 11 is used for determination of an exposure value and includes a light receiving cell 11-2 and an image forming lens 11-1 for forming an image of the object on the light receiving cell 11-2. The light measuring optical system 11 employs a visible ray of light to determine an exposure value of the camera. With the camera having such a construction as described above, at least five windows are necessitated and a lot of parts are also required. Thus, various inventions have been made to use an optical system commonly for a plurality of purposes in order to minimize such windows or parts.

An exemplary one of such inventions is illustrated in FIG. 7 wherein a single optical system is used commonly for the distance measuring optical system and the exposure setting light measuring optical system (Japanese Utility Model Publication No. 56-11051). The conventional arrangement is designed such that a filter which only transmits light of a distance measuring wavelength region is moved to or from a position in front of a light receiving element in order for the light receiving element to selectively receive a distance measuring light beam or an exposure light measuring light beam. In particular, referring to FIG. 7, light from a distance measuring light source 9-2 is reflected by a rotary mirror 9M and then collimated by a light throwing lens 9-1 and then projected on an object for photographing. The rotary mirror 9M is arranged such that it is rotated in response to an advancing and retracting movement of a photographing lens 2 and when an in-focus condition of the photographing lens 2 is reached, light projected through the lens 9-1 may be reflected by the object and introduced to an optical axis of a convex lens 8-2. A biprism P is arranged to divide a beam of light from the convex lens 8-2 around the optical axis into left and right beams of light. Accordingly, when an image of the object is formed on the optical axis, light will be received equally on a pair of photoelectric elements K1 and K2, but if the image of the object is displaced only a little from the optical axis, no light will be introduced to one of the photoelectric elements K1 and K2. The distance from the object is thus detected in accordance with the trigonometrical surveying from a rotational angle of the rotary mirror 9M when the image of the object is formed on the optical axis of the lens 8-2. In order to eliminate a possible disturbance of general external light upon measurement of a distance, a filter F which only transmits light of a wavelength of the light source 9-2 therethrough is disposed in front of the photoelectric elements K1 and K2.

When measurement of light for exposure is to be performed with the optical system of such a construction as described above, the filter F is retracted from the position in front of the photoelectric elements K1 and K2 so that the light having passed through the lens 8-2 and the biprism P is measured directly by the photoelectric elements K1 and K2. It is to be noted that circuits for processing signals from the photoelectric elements K1 and K2 are alternatively rendered operative in response to movement of the filter F to or from the position in front of the photoelectric elements K1 and K2.

If a filter which only transmits light of a wavelength for measurement of a distance therethrough is alternatively used for one of measurement of a distance or measurement of light and signal processing circuits are alternatively rendered operative in such a manner as described above, a single optical system can be used commonly for measurement of a distance and for measurement of light for exposure.

The conventional cameras described above have a drawback that they involve a lot of parts and the cost thereof is high as much because a lot of windows for various optical systems are required for the same as described above. Also the conventional arrangement described hereinabove with reference to FIG. 7 which has been invented to resolve the drawback also has a problem that the cost thereof is high because it requires several additional complicated devices such as a mechanism for alternatively moving the filter and a mechanism for changing over the signal processing circuits.

SUMMARY OF THE INVENTION

It is an object of the present invention to provide a camera which has a minimized number of windows for optical systems and is minimized in size and production cost.

In order to attain the object, according to one aspect of the present invention, there is provided a distance measuring and light measuring optical system for an automatic exposure camera of the type which includes an automatic distance measuring means including a light throwing means for throwing light of a predetermined wavelength for measurement of a distance and a light receiving means for receiving light of the predetermined wavelength, comprising and exposure setting light measuring optical system having an optical axis, and a mirror interposed obliquely in the optical axis of the exposure setting light measuring optical system and having a dielectric multi-layer film coated thereon for selectively reflecting light of the predetermined wavelength but transmitting light of any other wavelength therethrough, the light receiving means being disposed on an optical axis of light of the predetermined wavelength reflected by the mirror.

According to another aspect of the present invention, there is provided a distance measuring and light measuring optical system for an automatic exposure camera of the type which includes an automatic distance measuring means including a light throwing means for throwing light of a predetermined wavelength for measurement of a distance and a light receiving means for receiving light of the predetermined wavelength, comprising an exposure setting light measuring optical system having an optical axis, and a mirror interposed obliquely in the optical axis of the exposure setting light measuring optical system and having a dielectric multi-layer film coated thereon for selectively reflecting light of the predetermined wavelength but transmitting light of any other wavelength therethrough, the light throwing means being so disposed that an optical axis of light of the predetermined wavelength reflected by the mirror is coincident with the optical axis of the exposure setting light measuring optical means.

Since setting of an exposure value should be made by means of a visible ray, the wavelength to be detected for measurement of light for setting of an exposure value is within a visible ray region. Meanwhile, a region other than the visible ray region such as, for example, an infrared ray region can be used for the wavelength to be used for measurement of a distance. Accordingly, if a visible ray and some other ray of light are effectively separated from each other and individually measured by means of respective light receiving cells, then an optical system on the light receiving side of the distance measuring system can be used also for the light receiving system for exposure. According to the present invention, a mirror which only reflects light of a predetermined wavelength, for example, of an infrared ray region with a high ratio is employed as an optical element for such separation of rays of light of different wavelengths. The mirror is interposed obliquely (at an angle of 45 degrees, for example) in front of a light measuring light receiving cell for setting of an exposure value while a light receiving cell for measurement of a distance is disposed on an optical axis of an infrared ray of light reflected from the mirror such that a visible ray may be introduced to the light receiving cell for measurement of light and an infrared ray may be introduced to the light receiving cell for measurement of a distance. Otherwise, the mirror is interposed obliquely on an optical axis of an exposure setting light measuring optical system such that an infrared ray emitted from a light throwing means for measurement of a distance may be reflected thereby toward an object for photographing and a visible ray may be transmitted therethrough and introduced to a light receiving cell for measurement of light.

The mirror includes a plurality of layers alternately made of a dielectric substance having a low refractive index and another dielectric substance having a high refractive index such that it may selectively reflect light of a predetermined wavelength for measurement of a distance but may transmit light of any other wavelength therethrough. Where the outermost dielectric layer on the air side has an optical thickness of $\frac{1}{8}\lambda$ ($\lambda$ is a designed wavelength to be selectively reflected by the mirror) while the other dielectric layers have an optical thickness of $\frac{1}{4}\lambda$, such a mirror can be constructed that can reflect light only of the designed wavelenth $\lambda$ with a high ratio.

With the distance measuring and light measuring optical system of the present invention, the number of windows of a camera for receiving light therethrough is reduced by one and the number of parts is also reduced, which makes an appearance of the camera simple and allows the camera to be minimized in size and production cost.

The above and other objects, features and advantages of the present invention will become apparent from the following description and the appended claims, taken in conjunction with the accompanying drawings.

BRIEF DESCRIPTION OF THE DRAWINGS

FIG. 3 is a graph illustrating a spectral characteristic of the mirror of FIG. 2;

FIG. 4 is a similar view but illustrating spectral characteristics of a conventional distance measuring light receiving means;

DETAILED DESCRIPTION OF THE PREFERRED EMBODIMENTS

Figure 1:
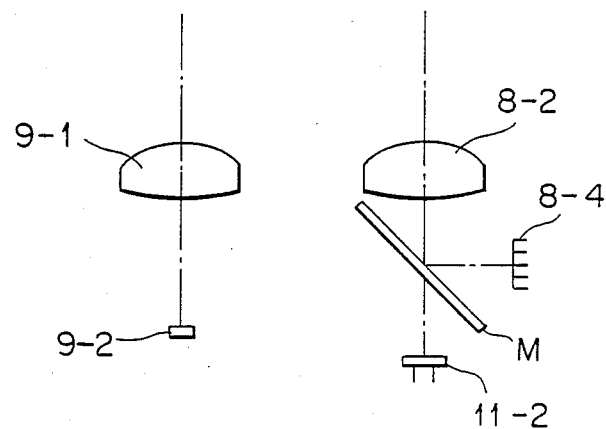
FIG. 1 is a schematic representation of a distance measuring and light measuring optical system showing a preferred embodiment of the present invention.
Figure 2:
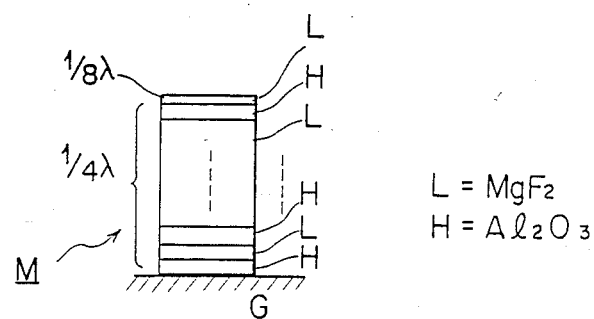
FIG. 2 is a schematic representation illustrating detailed construction of a mirror for use with the distance measuring and light measuring optical system of FIG. 1.
Figure 5:
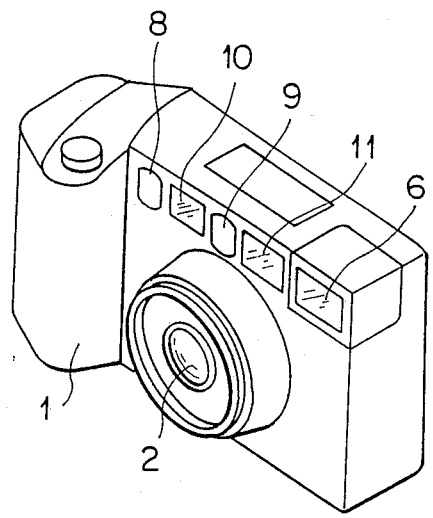
FIG. 5 is a perspective view showing a general appearance of a conventional automatic exposure and automatic focusing camera.
Figure 6:
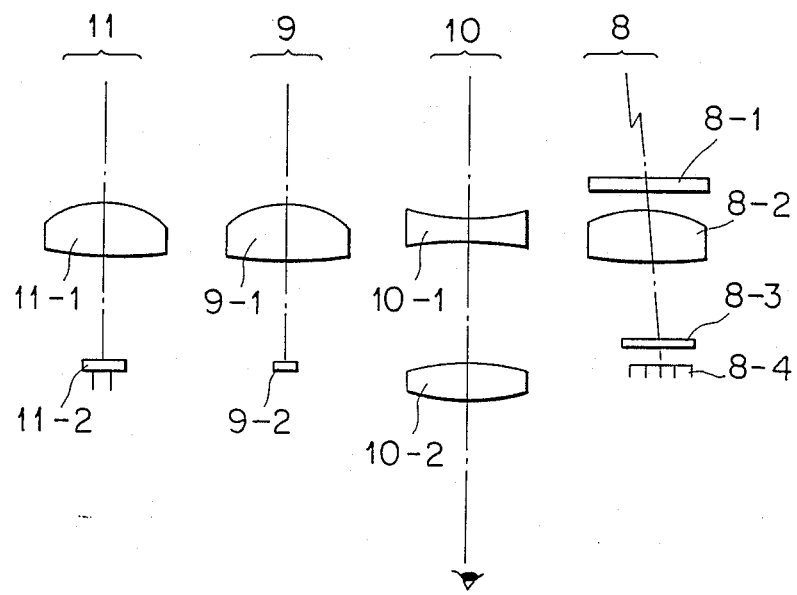
FIG. 6 is a schematic representation showing construction of conventional light measuring, distance measuring and viewfinder optical systems.
Figure 7:
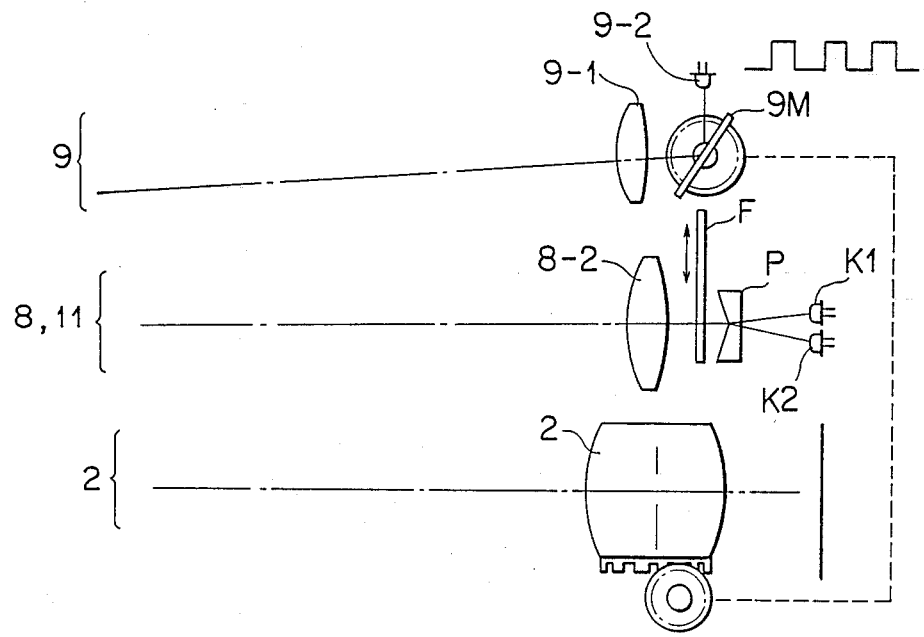
FIG. 7 is a schematic representation showing construction of another conventional optical system.

Referring first to FIG. 1, there is shown a distance measuring and light measuring optical system according to a preferred embodiment of the present invention. The optical system shown includes an infrared LED 9-2 for emitting an infrared ray for measurement of a distance therefrom. A convex lens 9-1 is provided to collimate infrared light emitted from the infrared LED 9-2 to be projected upon an object for photographing. A convex lens 8-2 for condensing light from the object to form an image of the object is used commonly for measurement of a distance and for measurement of light for setting of an exposure value. An array of light receiving cells 8-4 for measurement of a distance generally constitutes a line sensor which has a one-dimensional resolution and detects a distance to the object from the position of an image of the object formed thereon by the lens 8-2. A light receiving cell 11-2 for measurement of light is provided to measure an amount of visible light from the object. A mirror M which has such a performance that it transmits visible light therethrough but reflects infrared light is disposed at an angle of about 45 degrees with respect to an optical axis of the lens 8-2 between the lens 8-2 and the light receiving cell 11-2 so that it may transmit visible light therethrough to be introduced to the light receiving cell 11-2 but it may reflect an infrared ray to be introduced to the light receiving cells 8-4. The mirror M is one of the principal elements of the distance measuring and light measuring optical system of the present invention and has such a specific construction as illustrated in FIG. 2 wherein a plurality of dielectric layers L of a low refraction index and another plurality of dielectric layers H of a high refraction index both having an optical thickness of $\frac{1}{4}\lambda$ ($\lambda$ is a wavelength of a predetermined infrared ray which is to be selectively reflected by the mirror M) are placed alternately in layers on a glass plate G but only the outermost dielectric layer L on the air side, that is, remote from the glass plate G, is formed with the thickness equal to $\frac{1}{8}\lambda$. Owing to such a thin film formed from the dielectric layers L and H, the mirror M presents a high reflectivity and hence a very low transmittivity of almost zero at the wavelength $\lambda$ (in the case of the distance measuring and light measuring optical system of the present embodiment, "$\lambda$" is a wavelength of a predetermined infrared ray to be emitted from the LED 9-2) while it is improved in transmittivity to light of any other wavelength, that is, a wavelength in a wavelength region of visible rays and little reflects the visible rays. The dielectrics for the layers L and H may be composed of combinations selected from the group of $MgF_2$, $SiO_2$, $Al_2O_3$, $ZrO_2$ and $TiO_2$ and mixtures of the listed substances. The mirror M used in the optical system of the embodiment of the present invention has an 18-layer structure wherein the thin film thereon is composed of a layer L of the thickness equal to $\frac{1}{8}\lambda$, eight sets of layers H and L of the thickness equal to $\frac{1}{4}\lambda$, and a layer H of the thickness equal to $\frac{1}{4}\lambda$ placed in layers on a glass plate and the layers L are made of $MgF_2$, the layers H of $Al_2O_3$ and the glass plate is made of a glass which has a refraction index 1.52. The spectral reflecting characteristic of the mirror M is illustrated in the graph of FIG. 3.

FIG. 4 illustrates spectral characteristics of a conventionally employed distance measuring light receiving optical system. A curve a indicates a spectral characteristic of a conventional infrared ray transmitting filter which is used to cut visible rays. Another curve b indicates a spectral characteristic of a band pass filter which is used to determine a wavelength and a half-width of light to transmit therethrough depending upon a wavelength of light to be projected in order to cut light of a greater wavelength region than the wavelength used. It is to be noted that, in the case of the infrared ray transmitting filter of the curve a, a coloring matter is intermixed so that visible rays are cut almost by 100% by the filter. Meanwhile, the band pass filter of the curve b is achieved by interference of a multi-layer film and exhibits a high transmittivity to visible rays (400 nm to 700 nm). A further curve c indicates a spectral characteristic of a light receiving cell. A still further curve d indicates a composition of the spectral characteristics of the curves a, b and c and thus represents a spectral characteristic of the entire distance measuring light receiving optical system. Comparison between the spectral characteristic illustrated in FIG. 3 and the composite spectral characteristic illustrated in FIG. 4 reveals that a substantially equivalent spectral characteristic can be obtained by the distance measuring and light measuring optical system according to the present invention.

As described hereinabove, the distance measuring and light measuring optical system of the embodiment shown in FIG. 1 is designed such that the light receiving means for the exposure setting light measuring optical system is commonly used for the light receiving means for the automatic distance measuring means. However, according to the present invention, a distance measuring and light measuring optical system may otherwise be designed such that the light throwing means for an exposure setting light measuring optical system is commonly used for an automatic distance measuring means.

Figure 8:
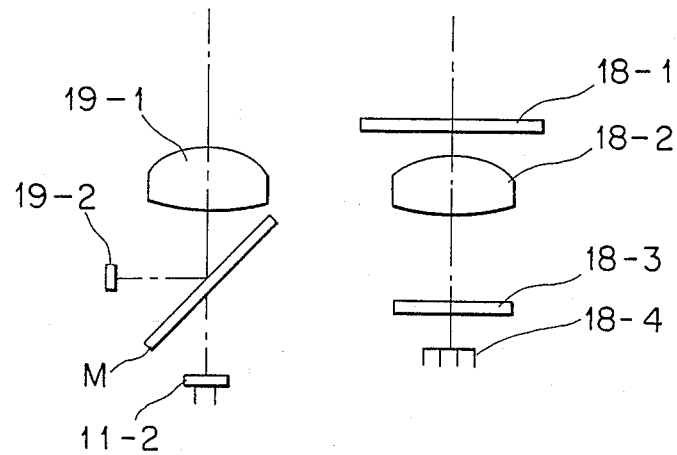
FIG. 8 is a schematic representation of a distance measuring and light measuring optical system showing another preferred embodiment of the present invention.

Referring now to FIG. 8, there is shown such a distance measuring and light measuring optical system as described just above. It is to be noted that like reference elements are denoted by like reference numerals to those of the embodiment shown in FIG. 1 with a prefix "1" added thereto and overlapping description thereof is omitted herein to avoid redundancy. The optical system shown includes an infrared LED 19-2 for emitting an infrared ray for measurement of a distance therefrom. A mirror M which is similar to the mirror M of the embodiment shown in FIG. 1 is disposed at an angle of about 45 degrees with respect to an optical axis of the infrared LED 19-2. A convex lens 19-1 is provided to collimate infrared light emitted from the infrared LED 19-2 and reflected by the mirror M to be projected upon an object for photographing. A convex lens 18-2 is disposed to condense light from the object to form an image of the object on an array of light receiving cells 18-4 for measurement of a distance generally constituting a line sensor. An infrared ray transmitting filter 18-1 and a band pass filter 18-3 are disposed in front of the light receiving cells 18-4. A light receiving cell 11-2 for measurement of light is disposed on the optical axis of the convex lens 19-1 such that it may receive visible light transmitted thereto from the object through the convex lens 19-1 and the mirror M.

With the optical system shown in FIG. 8, an infrared ray emitted from the infrared LED 19-2 is reflected by the mirror M so that it is directed to an object, and the reflected infrared ray from the object is received by the light receiving cells 18-4 while visible light from the object is transmitted through the convex lens 19-1 and the mirror M and received by the light receiving cell 11-2.

Having now fully described the invention, it will be apparent to one of ordinary skill in the art that many changes and modifications can be made thereto without departing from the spirit and scope of the invention as set forth herein.

What is claimed is:

1. A distance measuring and light measuring optical system for an automatic exposure camera of the type which includes an automatic distance measuring means including a light throwing means for throwing light of a predetermined wavelength for measurement of a distance and a light receiving means for receiving light of the predetermined wavelength, comprising an exposure setting light measuring optical system having an optical axis, and a mirror interposed obliquely in the optical axis of said exposure setting light measuring optical system and having a dielectric multi-layer film coated thereon for selectively reflecting light of the predetermined wavelength but transmitting light of any other wavelength therethrough, said light receiving means being disposed on an optical axis of light of the predetermined wavelength reflected by said mirror.

2. A distance measuring and light measuring optical system as claimed in claim 1, wherein light of the predetermined wavelength for measurement of a distance is an infrared ray.

3. A distance measuring and light measuring optical system as claimed in claim 2, wherein said dielectric multi-layer film is composed of a first layer adjacent the air having a thickness equal to $\frac{1}{8}\lambda$, $\lambda$ being the predetermined wavelength, and a plurality of additional layers each having a thickness equal to $\frac{1}{4}\lambda$, said first and additional layers being alternately made of a dielectric substance having a low refractive index and another dielectric substance having a high refractive index.

4. A distance measuring and light measuring optical system as claimed in claim 3, wherein the dielectric substance having a low refractive is $MgF_2$ and the dielectric substance having a high refractive index is $Al_2O_3$.

5. A distance measuring and light measuring optical system as claimed in claim 1, wherein an image forming lens, said mirror and a light measuring light receiving means are disposed in this order from the object side and said distance measuring light receiving means is disposed sidewardly of said mirror.

6. A distance measuring and light measuring optical system for an automatic exposure camera of the type which includes an automatic distance measuring means including a light throwing means for throwing light of a predetermined wavelength for measurement of a distance and a light receiving means for receiving light of the predetermined wavelength, comprising an exposure setting light measuring optical system having an optical axis, and a mirror interposed obliquely in the optical axis of said exposure setting light measuring optical system and having a dielectric multi-layer film coated thereon for selectively reflecting light of the predetermined wavelength but transmitting light of any other wavelength therethrough, said light throwing means being so disposed that an optical axis of light of the predetermined wavelength reflected by said mirror is coincident with the optical axis of said exposure setting light measuring optical means.

7. A distance measuring and light measuring optical system as claimed in claim 6, wherein light of the predetermined wavelength for measurement of a distance is an infrared ray.

8. A distance measuring and light measuring optical system as claimed in claim 7, wherein said dielectric multi-layer film is composed of a first layer adjacent the air having a thickness equal to $\frac{1}{8}\lambda$, $\lambda$ being the predetermined wavelength, and a plurality of additional layers each having a thickness equal to $\frac{1}{4}\lambda$, said first and additional layers being alternately made of a dielectric substance having a low refractive index and another dielectric substance having a high refractive index.

9. A distance measuring and light measuring optical system as claimed in claim 8, wherein the dielectric substance having a low refractive is $MgF_2$ and the dielectric substance having a high refractive index is $Al_2O_3$.

10. A distance measuring and light measuring optical system as claimed in claim 6, wherein an image forming lens, said mirror and a light measuring light receiving means are disposed in this order from the object side and said distance measuring light throwing means is disposed sidewardly of said mirror.

11. In an automatic exposure camera capable of measuring the distance or focus condition of an object relative to the camera at a predetermined wavelength beyond the desired wavelength range measured by the automatic exposure system, the improvement comprising:

an exposure setting light measuring system having an optical axis;

a reflector member positioned at an oblique angle to the optical axis and having a multilayer film coating on its surface, the film coating reflecting the predetermined wavelength and substantially transmitting the other wavelengths;

means, receiving the reflected predetermined wavelength, for providing a first signal to determining distance, and means, receiving the other wavelengths, for providing a second signal to determine exposure.

* * * * *